United States Patent
Gokturk et al.

(10) Patent No.: US 7,340,077 B2
(45) Date of Patent: Mar. 4, 2008

(54) GESTURE RECOGNITION SYSTEM USING DEPTH PERCEPTIVE SENSORS

(75) Inventors: Salih Burak Gokturk, Mountain View, CA (US); Carlo Tomasi, Palo Alto, CA (US); Fahri Sürücü, San Jose, CA (US); Abbas Rafii, Palo Alto, CA (US)

(73) Assignee: Canesta, Inc., Sunnyvale, CA (US)

( * ) Notice: Subject to any disclaimer, the term of this patent is extended or adjusted under 35 U.S.C. 154(b) by 691 days.

(21) Appl. No.: 10/369,999

(22) Filed: Feb. 18, 2003

(65) Prior Publication Data

US 2003/0156756 A1    Aug. 21, 2003

Related U.S. Application Data

(60) Provisional application No. 60/357,730, filed on Feb. 15, 2002, provisional application No. 60/394,068, filed on Jul. 2, 2002, provisional application No. 60/410,415, filed on Sep. 13, 2002.

(51) Int. Cl.
*G06K 9/00* (2006.01)

(52) U.S. Cl. ............ 382/103; 382/203; 348/208.14

(58) Field of Classification Search ............ 382/103, 382/106, 107, 154, 162, 168, 170, 171, 184, 382/189, 194, 199, 203, 209, 224, 232, 256, 382/260, 274, 285, 291–298, 305, 312, 132, 382/863, 473, 208; 715/863; 345/473; 701/208; 348/208.14

See application file for complete search history.

(56) References Cited

U.S. PATENT DOCUMENTS

| | | | |
|---|---|---|---|
| 3,610,754 | A | 10/1971 | Pirlet |
| 3,857,022 | A | 12/1974 | Rebane et al. |
| 4,187,492 | A | 2/1980 | Delignieres |
| 4,294,544 | A | 10/1981 | Altschuler et al. |
| 4,312,053 | A | 1/1982 | Lipsky |
| 4,333,170 | A | 6/1982 | Mathews et al. |
| 4,376,301 | A | 3/1983 | Roberts |
| 4,541,722 | A | 9/1985 | Jenks |
| 4,686,655 | A | 8/1987 | Hyatt |
| 4,688,933 | A | 8/1987 | Lapeyre |
| 4,716,542 | A | 12/1987 | Peltz et al. |

(Continued)

FOREIGN PATENT DOCUMENTS

DE    29802435 U1    6/1998

(Continued)

OTHER PUBLICATIONS

Naoshi Matsuo et al., "Speaker Position Detection System Using Audio-visual Information," Dec. 1999, XP 000931599, pp. 214-220.

(Continued)

*Primary Examiner*—Seyed Azarian

(57) ABSTRACT

Three-dimensional position information is used to identify the gesture created by a body part of interest. At one or more instances of an interval, the posture of a body part is recognized, based on the shape of the body part and its position and orientation. The posture of the body part over each of the one or more instances in the interval are recognized as a combined gesture. The gesture is classified for determining an input into a related electronic device.

21 Claims, 9 Drawing Sheets

U.S. PATENT DOCUMENTS

| | | | |
|---|---|---|---|
| 4,956,824 A | 9/1990 | Sindeband et al. | |
| 4,980,870 A | 12/1990 | Spivey et al. | |
| 4,986,662 A | 1/1991 | Bures | |
| 5,003,166 A | 3/1991 | Girod | |
| 5,056,791 A | 10/1991 | Poillon et al. | |
| 5,099,456 A | 3/1992 | Wells | |
| 5,102,223 A | 4/1992 | Uesugi et al. | |
| 5,166,905 A | 11/1992 | Currie | |
| 5,174,759 A | 12/1992 | Preston et al. | |
| 5,381,235 A | 1/1995 | Inoue et al. | |
| 5,442,573 A | 8/1995 | Bredberg et al. | |
| 5,454,043 A * | 9/1995 | Freeman | 382/168 |
| 5,573,077 A | 11/1996 | Knowles | |
| 5,617,371 A | 4/1997 | Williams | |
| 5,733,031 A | 3/1998 | Lin | |
| 5,802,208 A | 9/1998 | Podilchuk et al. | |
| 5,825,033 A | 10/1998 | Barrett et al. | |
| 5,835,616 A | 11/1998 | Lobo et al. | |
| 5,842,194 A | 11/1998 | Arbuckle | |
| 5,946,407 A * | 8/1999 | Bamberger et al. | 382/132 |
| 5,969,822 A | 10/1999 | Fright et al. | |
| 5,983,147 A | 11/1999 | Krumm | |
| 6,002,435 A | 12/1999 | Yamamoto et al. | |
| 6,005,958 A | 12/1999 | Farmer et al. | |
| 6,075,605 A | 6/2000 | Futamura et al. | |
| 6,108,437 A | 8/2000 | Lin | |
| 6,111,517 A | 8/2000 | Atick et al. | |
| 6,137,896 A | 10/2000 | Chang et al. | |
| 6,188,777 B1 | 2/2001 | Darrell et al. | |
| 6,195,104 B1 * | 2/2001 | Lyons | 345/473 |
| 6,252,598 B1 * | 6/2001 | Segen | 715/863 |
| 6,266,048 B1 | 7/2001 | Carau, Sr. | |
| 6,281,878 B1 | 8/2001 | Montellese | |
| 6,325,414 B2 | 12/2001 | Breed et al. | |
| 6,412,813 B1 | 7/2002 | Breed et al. | |
| 6,421,042 B1 | 7/2002 | Omura et al. | |
| 6,422,595 B1 | 7/2002 | Breed et al. | |
| 6,463,163 B1 | 10/2002 | Kresch | |
| 6,480,616 B1 | 11/2002 | Hata et al. | |
| 6,564,144 B1 * | 5/2003 | Cherveny | 701/208 |
| 6,614,422 B1 | 9/2003 | Rafii et al. | |
| 6,650,318 B1 | 11/2003 | Arnon | |
| 6,690,357 B1 | 2/2004 | Dunton et al. | |
| 6,710,770 B2 | 3/2004 | Tomasi et al. | |
| 6,734,879 B2 | 5/2004 | Hasha et al. | |
| 6,788,809 B1 * | 9/2004 | Grzeszczuk et al. | 382/154 |
| 6,791,700 B2 | 9/2004 | Omura et al. | |
| 6,801,662 B1 | 10/2004 | Owechko et al. | |
| 6,961,443 B2 | 11/2005 | Mahbub | |
| 7,003,136 B1 * | 2/2006 | Harville | 382/103 |
| 7,095,881 B2 * | 8/2006 | Lelong et al. | 382/132 |
| 2001/0043719 A1 | 11/2001 | Harakawa et al. | |
| 2002/0024676 A1 | 2/2002 | Fukuzaki | |
| 2002/0140949 A1 | 10/2002 | Sasaki et al. | |
| 2003/0048930 A1 | 3/2003 | Mihara et al. | |
| 2004/0153229 A1 | 8/2004 | Gokturk et al. | |

FOREIGN PATENT DOCUMENTS

| | | |
|---|---|---|
| EP | 0233464 A1 | 8/1987 |
| EP | 0370770 A1 | 5/1990 |
| EP | 0420500 A2 | 4/1991 |
| EP | 0626636 A2 | 11/1994 |
| EP | 0629964 A1 | 12/1994 |
| EP | 0982676 A1 | 3/2000 |
| EP | 1039365 A2 | 9/2000 |
| EP | 1045586 A2 | 10/2000 |
| GB | 1073503 A | 6/1967 |
| WO | WO 84/00427 A1 | 2/1984 |
| WO | WO 00/19705 A1 | 4/2000 |
| WO | WO 00/21024 A1 | 4/2000 |
| WO | WO 02/21502 A1 | 3/2002 |

OTHER PUBLICATIONS

IBM Corp., "Virtual Keyboard" ISB Tech Disclosure Bulletin, Mar. 1990, vol. 32, No. 10B, XP 000097915, pp. 359-360.

A.E. Savakis et al., "Restoration of Real Defocused Images Using Blur Models Based on Geometrical and Diffraction Optics," 1991, IEEE, pp. 919-922.

Ren C. Luo et al., "Defocusing Blur Restoration in Natural Scene Images for Factual Analysis," Nov. 15, 1993, IEEE, pp. 1377-1381.

"Sonar," encyclopedia article from Wikipedia (electronic publication, no date).

* cited by examiner

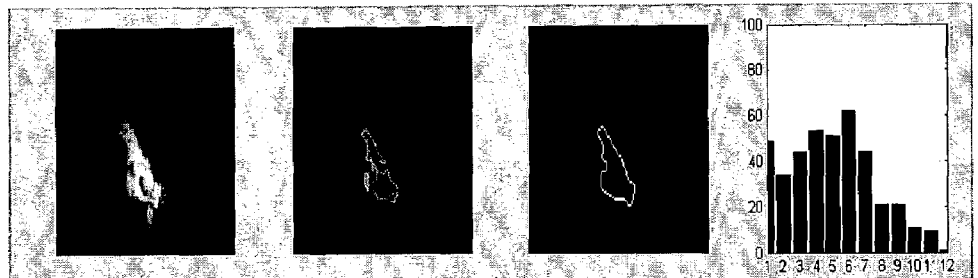
510    520    530    540    FIG. 5A
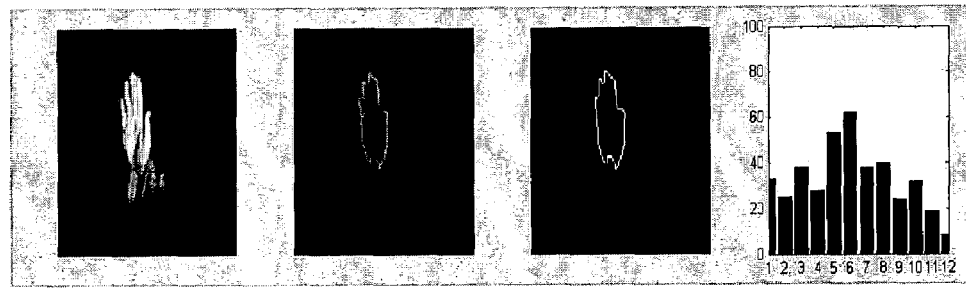
510    520    530    540    FIG. 5B
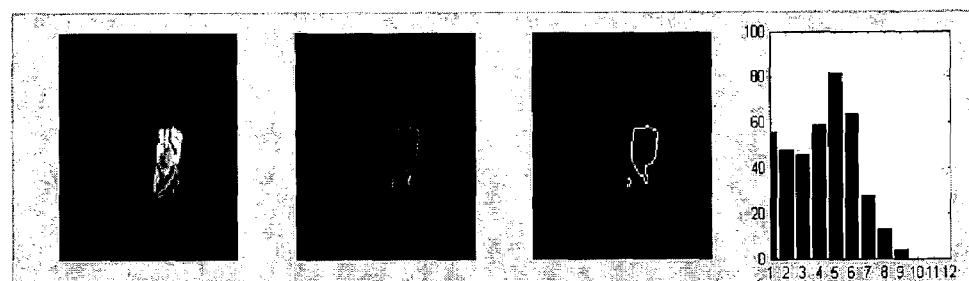
510    520    530    540    FIG. 5C

510 520 530 540 FIG. 5D
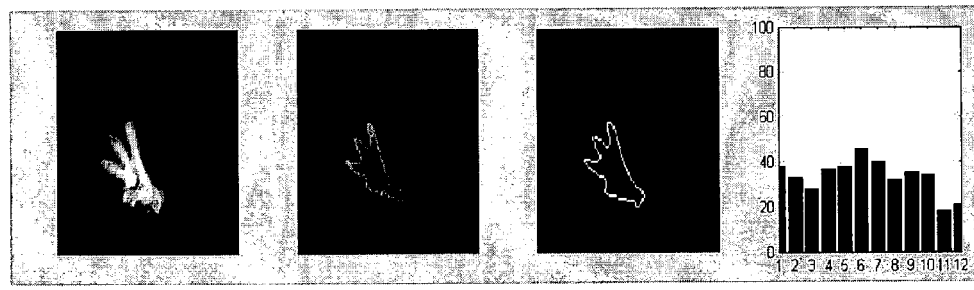
510 520 530 540 FIG. 5E
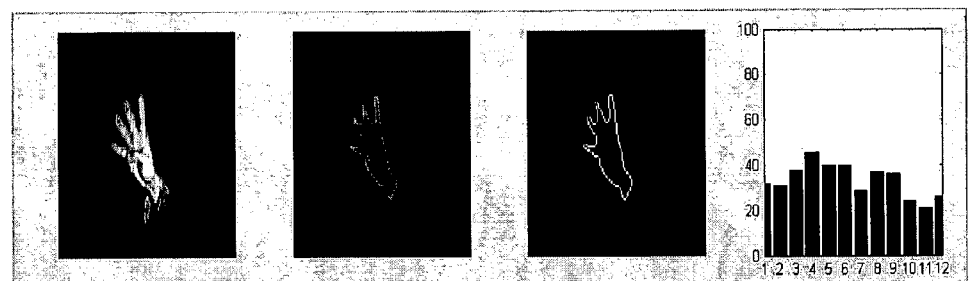
510 520 530 540 FIG. 5F 510　　　　　520　　　　　530　　　　　540

510　　　　　520　　　　　530　　　　　540

510　　　　　520　　　　　530　　　　　540

GESTURE RECOGNITION SYSTEM USING DEPTH PERCEPTIVE SENSORS

PRIORITY INFORMATION

This application claims benefit of priority to the following applications:

Provisional U.S. Patent Application No. 60/357,730, entitled "Natural Touch and Gesture Based Interaction for Electronic Systems," filed Feb. 15, 2002, naming Jim Spare, Cyrus Bamji and Abbas Rafii as inventors;

Provisional U.S. Patent Application No. 60/394,068, entitled "Shape Representation and Recognition by Random Histograms," filed Jul. 2, 2002, naming Salih Burak Gokturk as inventor; and Provisional U.S. Patent Application No. 60/410,415, entitled "Gesture Recognition System with 3D Input," filed on Sep. 13, 2002, naming Salih Burak Gokturk, Fahri Surucu, and Carlo Tomasi as inventors.

All of the aforementioned priority applications are hereby incorporated by reference in their respective entirety for all purposes.

FIELD OF THE INVENTION

The present invention relates to electronic perception technology. In particular, the present invention relates to a gesture recognition system that uses depth perceptive sensors.

BACKGROUND OF THE INVENTION

Electronic systems exist for using gestures, such as those created by the movement of a hand, as input. For example, there are handwriting recognition devices that interpret a user's gesture made through a stylus or pen as input. Also, there are systems that gear users with wiring or other implements in order to track the user's hand or body movements.

There have been attempts to implement gesture recognition systems and techniques using optical sensors. For example, U.S. Pat. No. 6,252,598, describes the use of video images to identify hand gestures. A plurality of regions in the frame are defined and screened to locate an image of a hand in one of the regions. A hand image is processed to locate extreme curvature values, such as peaks and valleys, corresponding to predetermined hand positions and gestures. The number of peaks and valleys are then used to identify and correlate a predetermined hand gesture to the hand image for effectuating a particular computer operation or function. In order to find the curvature values on the hand, the boundaries of the hand must be reliably obtained. This can be problematic because the edges of an intensity image are closely related to the lighting and background properties of the scene. Furthermore, the intensity of the image makes use of the system dependent on the lighting of the scene.

U.S. Pat. Nos. 6,256,033 and 6,072,494 provide for a computer-implemented gesture recognition system. These systems require a background image model to be created by examining frames of an average background image before the subject that will perform the gesture enters the image. The necessity of having the background picture reduces the practical applicability of the method, particularly since the background can change due to movements in the background, or changes to lighting or shadows.

U.S. Pat. No. 6,222,465 describes a system and method for manipulating virtual objects in a virtual environment, for drawing curves and ribbons in the virtual environment, and for selecting and executing commands for creating, deleting, moving, changing, and resizing virtual objects in the virtual environment using intuitive hand gestures and motions. The system is provided with a display for displaying the virtual environment and with a conceptual description of a video gesture recognition subsystem for identifying motions and gestures of a user's hand.

U.S. Pat. No. 6,204,852 describes a video gesture-based three-dimensional computer interface system that uses images of hand gestures to control a computer. The system tracks motion of the user's hand or an elongated object or a portion thereof in a three-dimensional coordinate system with five degrees of freedom. The system contains multiple cameras. These cameras are not used to obtain a depth image of the scene. Instead, every camera image is processed independently, and the location of the finger is located in both of the cameras. The location of the finger is next located by the geometry between the cameras and the finger's location in each image. The orientation of the finger is determined in a similar manner. The method is intended to be used for applications with a pointing finger. Furthermore, if multiple fingers are used in the gesture, the method may not be able to unambiguously determine the corresponding fingers in each image.

U.S. Pat. No. 5,781,663 describes an image recognition apparatus that operates in three modes. A gesture recognition mode is used to recognize an input locus as a command, a figure recognition mode is used to recognize a figure, and a character recognition mode is used to recognize a character.

U.S. Pat. Nos. 5,454,043, 6,002,808, and 5,594,469, each provide a gesture recognition framework using intensity images. The patents illustrate the use of moments and frequency histograms for image representation and recognition. The algorithms described therein rely on the edges of the hands in the intensity images, and therefore the described systems are very much affected by ambient conditions of the environment, such as by a background that has similar color with the skin. For instance, the system might misinterpret the edges when there is not enough illumination on the foreground (hand) so that edges between the foreground and background disappear.

SUMMARY OF THE INVENTION

In an embodiment, a method is provided that enables a person to interact with an electronic device. The method includes obtaining position information for a plurality of discrete regions on a body part of the person. The position information indicates a depth of each discrete region on the body part relative to a reference. The gesture is classified using the position information. The classification of the gesture may be used as input for interacting with the electronic device.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIGS. 5A-5I illustrate a series of snap shots that show the use of histograms to identify hand gestures.

DETAILED DESCRIPTION OF THE INVENTION

Figure 1:
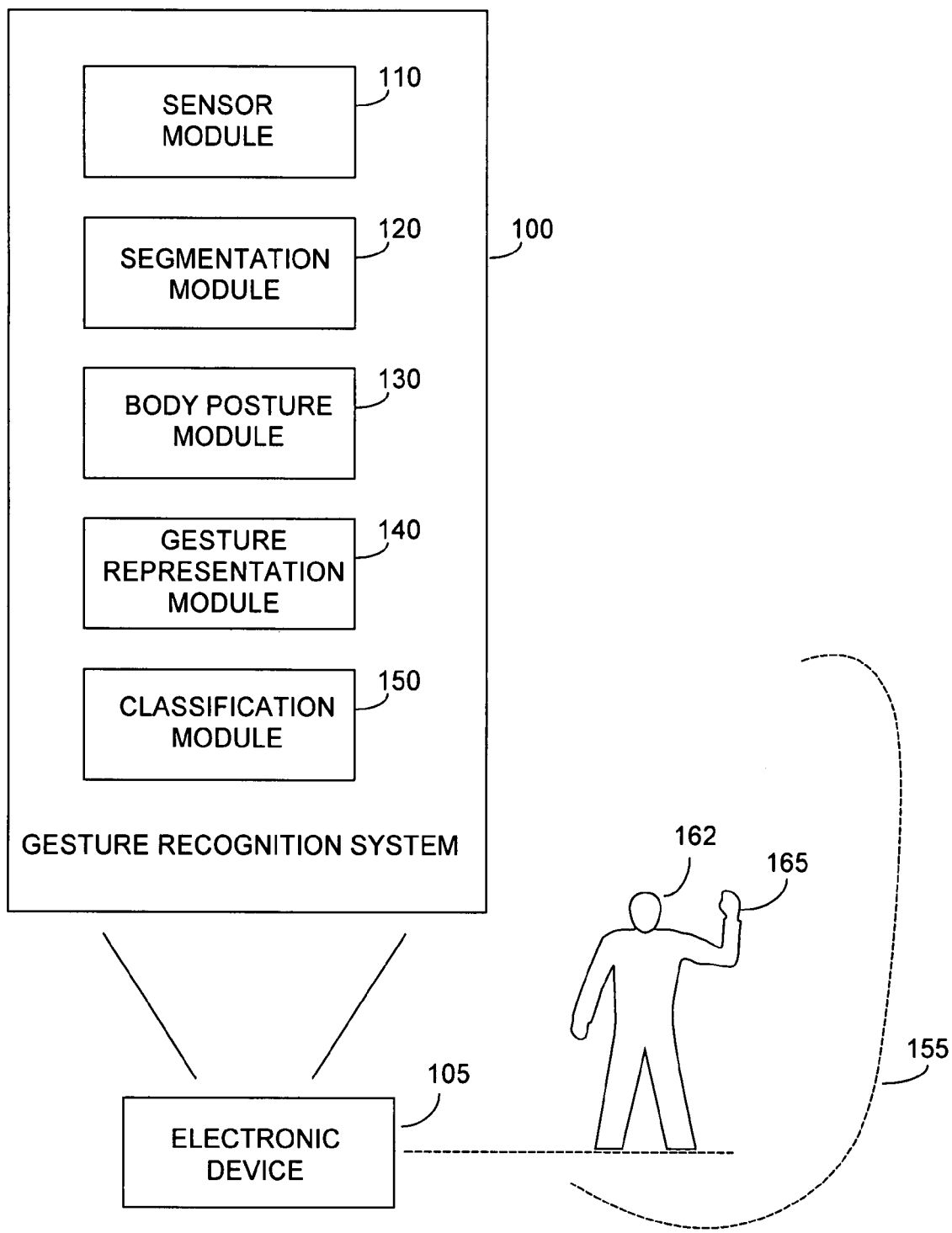
FIG. 1 illustrates a gesture recognition system for using depth perception to recognize the gesture created by a body part of a person.

Embodiments of the invention describe methods and apparatuses for recognizing gestures of body parts using depth perceptive sensors. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

Embodiments of the invention provide for techniques that can be employed to identify and/or recognize the movement or posture of objects in a three-dimensional space. The identification or recognition of the object's movement may be used as input for an electronic device or system, including, for example, appliance, a mobile device such as a cell phone or PDA, a game console, an audio/visual entertainment center, a toy, or a robot. The electronic device may assign a meaning to that input and take an action specific to that system. In one embodiment, algorithms for classifying gestures as input are performed within the electronic system (input is generated internally) where the input is to be entered. In another embodiment, such algorithms are performed on a separate computer system that communicates with the electronic device where the input is to be received over a communication line. A particular point of interest is the identification and recognition of a person's body movements, with specific interest in hand gestures. However, embodiments of the invention may pertain to all body movements, such as arm or foot movements, in addition to movements by other types of objects, including objects such as stylus, pointers and other objects that are carried by persons.

Embodiments of the invention also include components or processes for use in identifying and/or recognizing the movement or posture of objects in three-dimensional space. Such components or processes may provide for obtaining depth information from an object that is making the gesture, a segmentation module to separate an image of the object from the background, a posture representation module that identifies a specific pose and/or shape of the object, a gesture representation module that identifies the overall gesture and a classification module that classifies the recognized gesture as a designated input.

In one embodiment, a three-dimensional gesture recognition system is communicatively coupled to a translation system in order to translate gesture recognition information into one or more specific inputs. According to embodiments described herein, a system is provided to detect the relative position of a user's fingers, hands, or other body part, and to interpret these movements, precisely as they are made, into an electronic system as input. A system such as described accomplishes this without requiring the user to be outfitted with wires, markers or other physical implements.

In another embodiment, a system or method is provided to detect positioning and movement of a user's finger, hand or body in real-time. The system may, for example, provide feedback to the user about the user's movements and position.

In contrast to existing systems, embodiments of the invention enable a user to utilize his own fingers, hands, or other body movements, without any physical implements for tracking movement, in order to control the electronic system.

Embodiments of the invention provide several advantages over other approaches that have been developed for recognizing gestures of body parts and other movements. For example, embodiments described herein use depth information, which is independent of lighting conditions in the environment. This is in contrast to other approaches that rely on analysis of light intensity. Light intensity is often too sensitive to be reliable. Techniques described for use with embodiments of the invention eliminate the background variables by using depth images. The result is a gesture recognition system that is robust to changes in lighting or appearance of the background.

In addition, embodiments described herein are suitable for recognizing a variety of types of gestures, including hand motions, and motions of varying intensity and speed. In contrast, many past approaches have been limited to pointing and handwriting applications, which require relatively simple gestures in a very limited environment (e.g. only on a computer tablet).

Embodiments of the invention may be implemented in the form of instructions that are executable by one or more processors. The instructions may then be provided, stored, or carried, on a computer-readable medium. Examples of computer-readable memory includes memory or a communication channel or medium.

B. Terminology

The term "body gesture" or "hand gesture" refers to a set of one or more consecutive set of body or hand postures. A body/hand gesture is static if only one posture is identified or recognized. A body/hand gesture is dynamic if more than one consecutive hand postures are identified or recognized collectively. Such consecutive hand postures may result from capturing the body part moving between a starting position and an ending position, or over a series of time intervals.

The term "image" means an instance of light recorded on a tangible medium. The image does not have to be a recreation of the reflection, but merely record a characteristic such as brightness, particularly from various points of a surface or area in which a reflection is being created. The tangible medium may refer to, for example, an array of light-sensitive pixels.

As used herein, a "module" includes logic, a program, a subroutine, a portion of a program, a software component or a hardware component capable of performing a stated task, function, operation, or process. A module can exist as hardware, software, firmware, or combination thereof. Furthermore, one module may be distributed over several components or physical devices, so long as there are resources that cooperate with one another to perform the functions of the module.

The term "depth" means a depth-wise distance. The depth refers to a distance between a sensor and an object that is being viewed by the sensor. The depth can also be a relative term such as the vertical distance from a fixed point in the scene closest to the camera.

A "computer-readable medium" includes any medium wherein stored or carried instructions can be retrieved or otherwise read by a processor that can execute the instructions.

C. Gesture Recognition System and Method

A gesture recognition system is described for detecting and recognizing body gestures. The use of hand gestures is only one type of object that can be used with embodiments of the invention. The hand, in particular, may have various complex movements and postures, reflecting positioning and orientation of individual fingers, the wrist and/or the palm. Thus, the description provided for detecting and recognizing hand gestures is illustrative of the capabilities provided by embodiments of the invention.

FIG. 1 illustrates a gesture recognition system 100 for using depth perception to recognize the gesture created by a body part of a person, under an embodiment. The body part that is recognized by a system such as described in FIG. 1 may include, for example, a finger, a hand, an arm, a leg, a head, a shoulder or a combination thereof. The body part may include other moveable pats of a person, such as the eye lids winking or the eye balls moving side to side, and the mouth opening or moving (such as when the person is speaking). The hand gesture recognition system includes a three-dimensional sensor system 110, a segmentation module 120, a body posture module 130, and a classification module 140. In addition, a body gesture representation module 150 may be provided as one of the optional features for the gesture recognition system 100. The gesture recognition system 100 may operate over a region 155.

A system such as described in FIG. 1 is invariant to the type of three dimensional sensor system that is used. One suitable three-dimensional sensor system is described in U.S. Pat. No. 6,323,942 (hereby incorporated by reference in its entirety for all purposes). This patent describes a system that sends out a pulse of light to a targeted region, and measures the time that the pulse takes to travel. Another type of three-dimensional sensor is a stereo-camera method. This type of sensor system uses two cameras and finds the location of every corresponding point in both images. An example of such a sensor system is described in literature such as Machine Vision, by Ramesh Jain, Rangachar Kasturi, Brian G. Schunck, published by McGraw-Hill in 1995.

For purpose of description, a person 162 located within the region 155 is able to move or position a particular body part, such as a hand 165, in order to enter input for a related electronic device 105. In one embodiment, the gesture recognition system 100 may be provided as an integral part of the electronic device 105. The electronic device 105 includes virtually any type of device, including a portable computer (such as a personal digital assistant or laptop), smart cellular phone, television set, stereo system, musical instrument, robot, toy, gaming console, or appliance. The gesture recognition system 100 may recognize gestures of the person 162 to provide input to the electronic device 105. In another embodiment, the gesture recognition system 100 may be separate from the electronic device 105, but coupled to the electronic device through a communication medium.

The communication medium may be wireless. For example, the communication medium may be infrared or a radio-frequency channel. The communication medium may also be a physical connection, such as a serial bus line. The gesture recognition system 100 may be applicable to various environments. For example, the gesture recognition system 100 may be employed in a car (adjustment of car stereo), in a home (control television and audio system), or in a business area (control electronic doors).

The three-dimensional sensor system 110 may identify position information for the body part, including depth-wise position information for discrete portions of the object. The three-dimensional sensor system 110 may create a depth image that contains position information of the entire scene in the region 155, including position information of the body part of interest. The segmentation module 120 may segment the body part of interest from background and other objects in the depth image. The body posture module 130 determines the shape and position of the body part of interest statically at one particular interval. The dynamic determination may be determined when the body part moves in the region 155. The gesture representation module 150 is used to identify the gesture created dynamically over a duration by the body part if movement of the body part is to be a factor in determining what the input from the user is.

The identified body gesture may be classified by classification module 140. The classification module 140 may classify the identified body gesture to a particular body gesture among a set of multiple body gestures. The particular body gesture may then be correlated into input.

Figure 2:
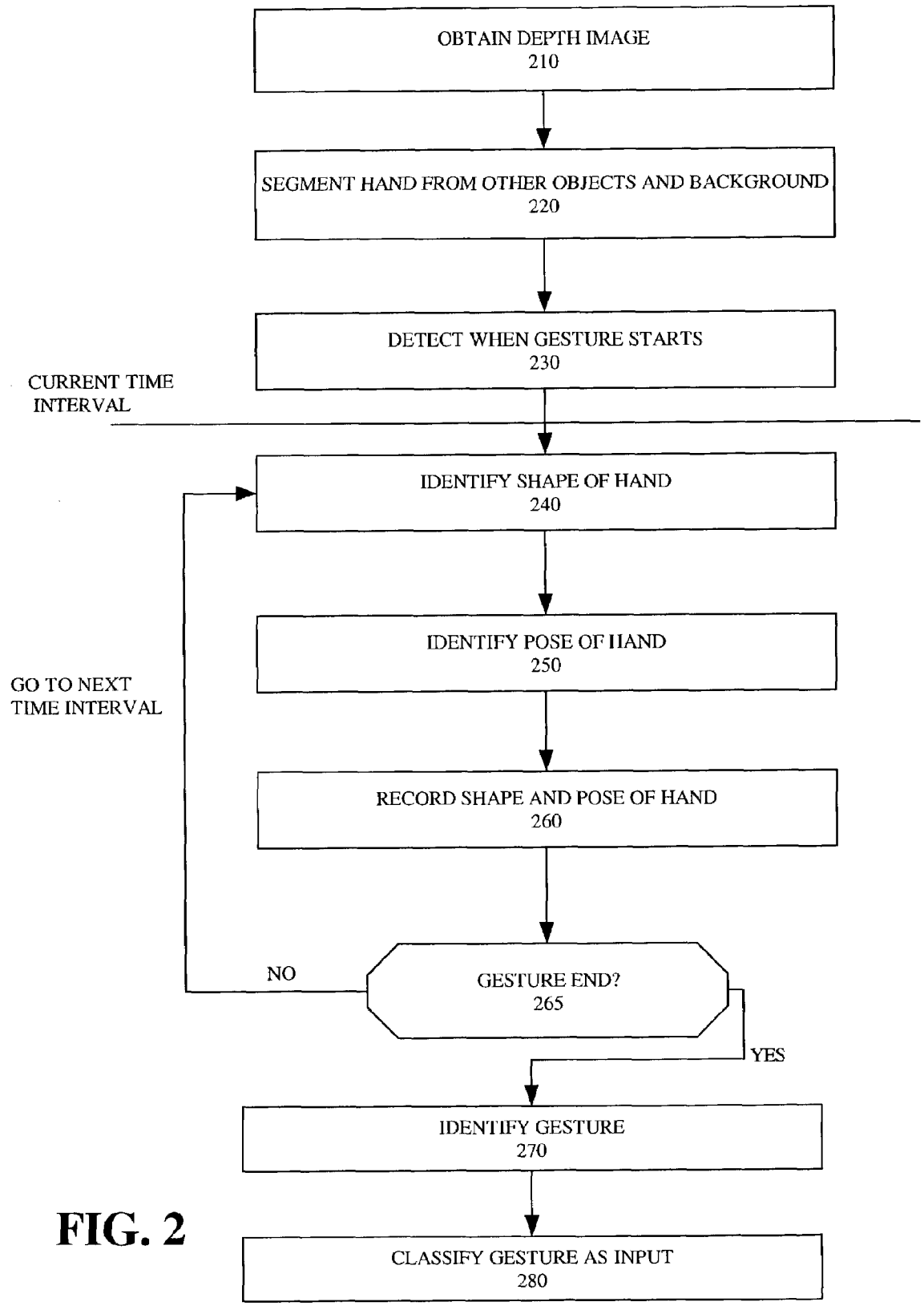
FIG. 2 illustrates a method for implementing a gesture recognition system, according to an embodiment of the invention.

FIG. 2 illustrates a method for implementing a gesture recognition system, according to one embodiment. A method such as described in FIG. 2 may be implemented using components such as described by FIG. 1.

Step 210 provides that a depth image is obtained from a scene where a hand gesture or other body movement is made. The depth image may be obtained using a three-dimensional sensor system that can determine a range between discrete portions of an object and a sensor system. In some applications, a three-dimensional sensor is sometimes referred to as a "2½ dimensional" sensor system. In either case, an embodiment such as described by FIG. 2 provides that the sensor system obtains depth-wise position information for discrete portions of an object that has or is making the gesture.

A sensor system for use with such an embodiment may employ various three-dimensional sensing techniques. For example, the sensor system may reflect and modulate light and use the time of flight to determine the range of discrete portions of an object. Other embodiment may use one or more techniques, including active triangulation, stereovision, depth from de-focus, structured illumination, and depth from motion. U.S. Pat. No. 6,323,942, entitled "CMOS Compatible 3-D Image Sensor" (hereby incorporated for all purposes in its entirety) describes components and techniques that can be employed to obtain the sensor information.

The sensor systems may provide a three-dimensional depth image of the scene. The depth image may be captured on a panel of pixels, where each pixel contains a discrete portion of the image attributable from one portion of the surface being imaged. Each pixel that forms the depth image gives an indication of depth information corresponding to a distance between the portion of the surface being imaged by that pixel and the sensor system. If, for example, three-dimensional sensor system such as described in U.S. Pat.

No. 6,323,942 is used, distance information is collected for the space represented by each pixel in a field of the sensor system's view.

In step 220, the depth image is analyzed in order to segment the hand or other body component of interest from other objects and background captured by the depth image. A method such as described in FIG. 3 may be used to segment the hand or other body component of interest.

Step 230 corresponds to detecting when the gesture starts. According to one embodiment, the beginning and end of the gesture are identified using delimiters that are separate from analysis of the hand gesture. For example, the user may perform a designated action, such as creating a specific sound (clapping) or creating a specific hand posture, in order to signal the beginning of the hand gesture. In another embodiment such as described with FIG. 7, the analysis of the hand gesture also identified the start and end of the hand gesture.

Figure 4:
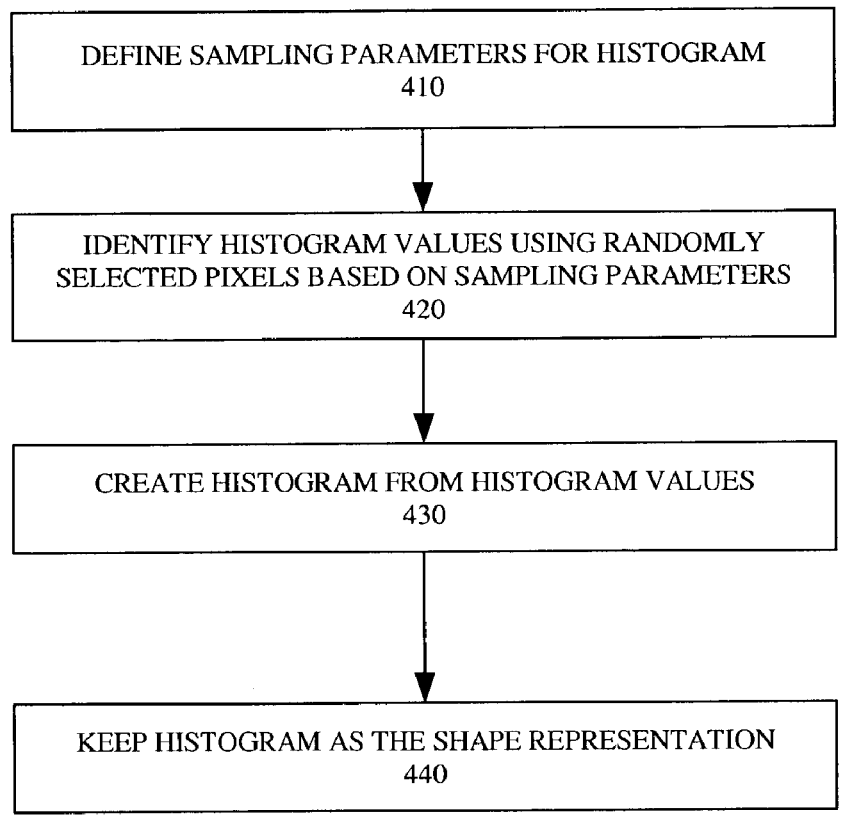
FIG. 4 illustrates a method for recognizing a posture of a body part of interest, under an embodiment of the invention.

From when the hand gesture starts, one or more intervals are used in order to recognize the hand gesture as an input. Each interval corresponds to the time where a hand posture is determined. The hand posture is a hand gesture that is viewed statically in a particular interval of time. Step 240 provides that the shape of a hand at the current time interval is determined. FIG. 4 illustrates one method, under an embodiment of the invention, for determining the shape of a hand when the hand is making a gesture.

Figure 5G:
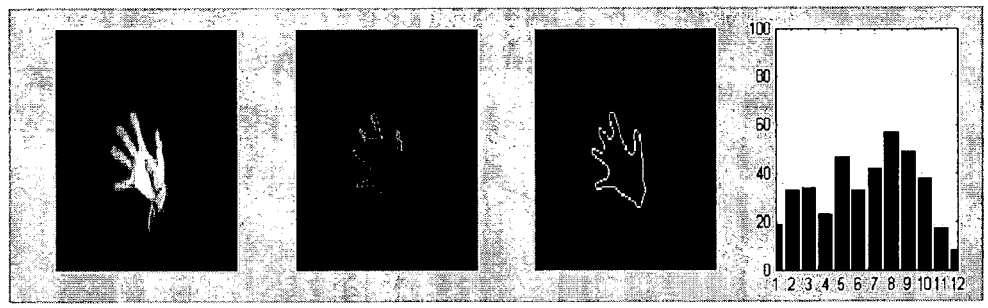
Figure 5H:
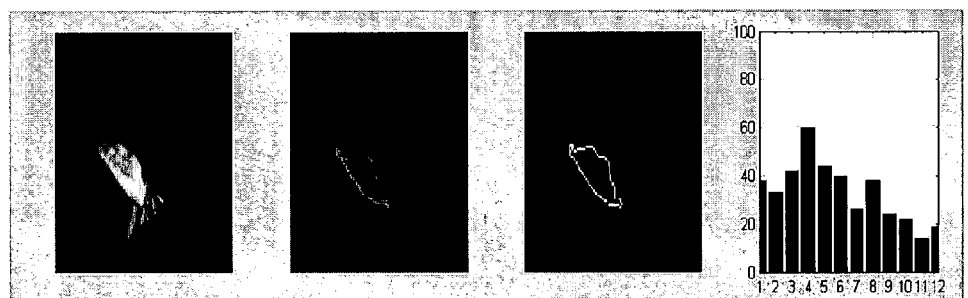
Figure 5I:
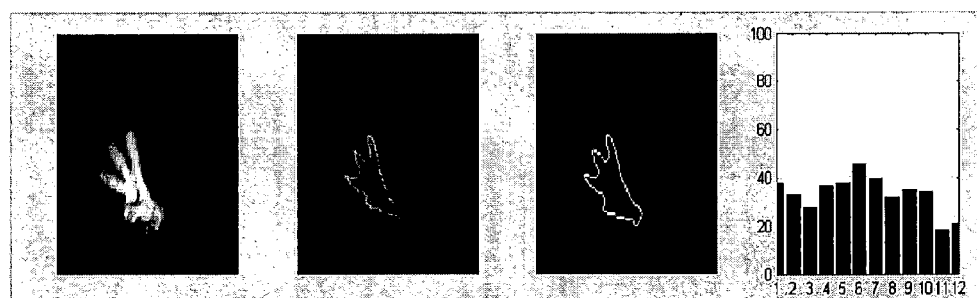

In step 250, the pose of the hand is identified. The pose of the hand refers to the position of the hand in three coordinates within the region of observation, and the orientation of the hand in that region. FIG. 5 describes one method, under an embodiment of the invention, for determining the pose of a hand when the hand is making a gesture.

In step 260, the shape and pose of the hand at the particular interval is recorded. For example, the shape and pose may be stored in memory, and made available for combination with other determinations of the shape and pose of the hand in preceding or succeeding intervals.

In step 265, a determination is made as to whether the gesture has ended. As with step 230, this determination may be used using delimiters that are separate from analysis of the hand gesture. Alternatively, the end of the gesture may be determined by analyzing hand postures in succeeding intervals to determine when the hand gesture has started and stopped. If the hand gesture has not stopped, steps 240-265 are repeated for the next time interval.

If the hand gesture has stopped, step 270 provides that the gesture is identified. If the hand gesture is a posture (one interval), the hand gesture may be identified by determining the shape and pose of the hand (see FIG. 4 and FIG. 5). Otherwise, a method such as described in FIG. 7 may be used to identify the hand gesture when the hand gesture has varying or dynamic hand gestures, or when the hand gesture lasts for a duration of two or more intervals.

In step 280, the hand gesture is classified. For example, the identified hand gesture may be compared to a set of multiple designated hand gestures. The comparison may select one classification for the identified hand gesture. This may correspond to correlating the hand gesture to input data. The input data can be a simple code or a series of commands to an electronic system.

D. Segmentation

Figure 3:
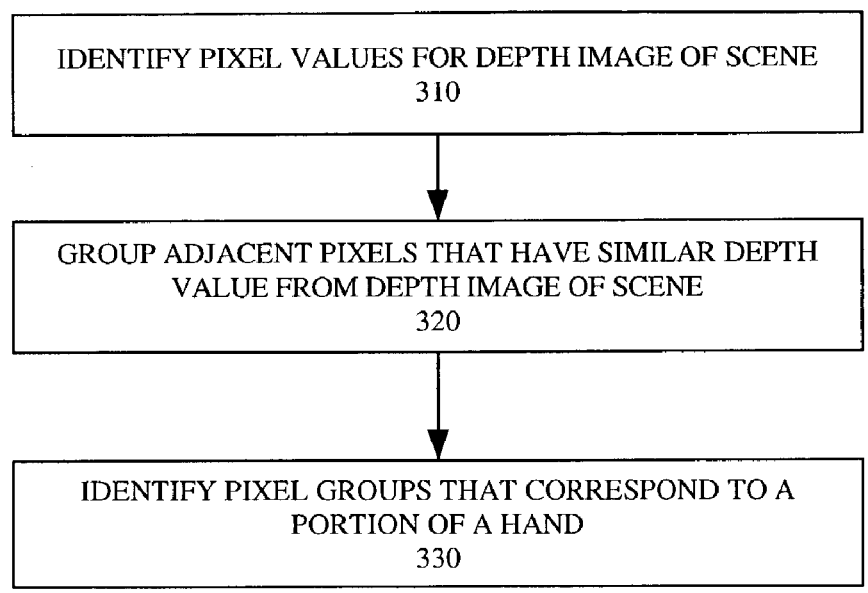
FIG. 3 describes a method for using depth information to segment a body part from an image of a scene so that the gesture made with the body part can be identified and classified.

Segmentation refers to a process where a body part of interest is delineated from other objects in a scene that is being observed for purpose of recognizing a gesture made by that body part. FIG. 3 describes a method for using depth information to segment a body part from an image of scene in order to identify and classify the gesture made with that body part. For purpose of description, the body part may be assumed to be a hand that gestures. A method such as described in FIG. 3 may be performed by the segmentation module 120 in FIG. 1. Reference to elements of FIG. 1 are for descriptive purposes only.

A method such as described in FIG. 3 uses the depth information contained within the depth image to segment the hand (or other body part of interest) for the gesture recognition system. The depth image contains a depth value at each of its pixels. Step 310 provides that the pixel values for the depth image of the scene are identified. The depth value of each pixel corresponds to the depth of a particular discrete portion of the visible region that can be sensed with the sensor system 110. For example, the depth image of a scene that contains one or more hands in front of the background will have pixels that map to hands and pixels that map to the other objects in the background.

In step 320, adjacent pixels that have similar depth values are grouped together. If there is a prior expectation for the depth of a hand, then the objects that are inconsistent with that expectation can be directly eliminated. In order to group pixels with similar depths, standard segmentation algorithms could be applied on the remainder of the depth image. For instance, the classical image split-and-merge segmentation method by Horowitz and Pavlidis provides for splitting the image into parts. It then tests both individual and adjacent parts for "homogeneity" according to some user-supplied criterion. If a single part does not satisfy the homogeneity criterion, it is split into two parts. If two adjacent parts satisfy the criterion even after they are tentatively regarded as a single region, then the two parts are merged. The algorithm continues this procedure until no region need be split, and no two adjacent regions can be merged. Although this algorithm was designed for regular brightness or color images, it could be applied to depth images as well.

An alternative is to use this or another segmentation algorithm on the gradient of the depth image, so that the value of any threshold used in the homogeneity criterion becomes less critical. Specifically, a region can be declared to be homogeneous when the greatest gradient magnitude in its interior is below a predefined threshold.

Still further, another alternative is to use the k-means algorithm to cluster the depth map into regions with similar depths. However, one shortcoming of such algorithms is that it is usually hard to determine a priori a good value for the number k of clusters to be computed. To overcome this problem, an adaptive scheme for the selection of k can be applied. Standard image segmentation methods such as a normalized cut method can also be applied to find the segments that belong to objects at different depths.

Step 330 provides that pixel groups that correspond to a portion of a hand are identified. In one embodiment, pixel groups of a particular depth or assumed to be portions of the hand. For example, the sensor system 110 may be aligned so that the hand of the person is the closest object to a camera of the sensor system. The pixel groups that have depth information identifying them as the closest group may be identified as portions of the hand.

In an other embodiment, a camera or other image capturing device, including one that is used with the sensor system 110, may capture light-intensity information with a second panel of pixels. In such an embodiment, intensity characteristics that identify shading or pigmentation may be analyzed to match predetermined values corresponding to the skin on a person's hand.

E. Posture Recognition And Representation

Embodiments of the invention provide for recognizing and representing the posture of body parts of interest, and in particular hand gestures. FIG. 4 illustrates a method for recognizing a posture of a body part of interest, under an embodiment of the invention. The body posture may be determined at one instance, or at many instances over a given duration, in order to correlate the posture as an input for a related electronic device. For purpose of description, the body part is assumed to be a hand that gestures. A method such as described in FIG. 4 may be performed by the body posture module 130 in FIG. 1. Reference to elements of FIG. 1 are for descriptive purposes only.

In order to determine body posture, the shape of the body part of interest, and the pose of the part are determined. The pose of the body part refers to its position and the orientation.

According to one embodiment, a statistical methodology is used to determine the shape of the body part. One particularly useful statistical methodology is the histogram, which can represent images in a compressed form. Random histogram information can be used to accurately represent an image by collecting statistics on a sufficiently large sample of pixels.

In an embodiment, a pose of the body part may be determined using a methodology such as singular value decomposition. The pose, in combination with the shape of the body part, provide the body part posture. As will be described, the body part posture, or a gesture that comprises the body part posture, are identifiable as input to an electronic device.

With reference to FIG. 4, step 410 provides that sampling parameters are defined for a histogram that is to be created from the segmented image of the body part of interest (determined with a method described in FIG. 3). Histogram are based on identifying the number of occurrences of a data point that has a particular aspect. The idea is simple to implement when data points contain one-dimensional data. An example of one-dimensional information is the distance between random points. For this case, histogram can directly be obtained by counting the number of occurrences towards each bin.

The sampling parameters define the aspect of the segmented image that is to be the source for information contained in a histogram. Once properly constructed, such a histogram can be used for determining the shape of the body part. Specifically, the sampling parameters define what is to be a bin (aspect) of the histogram, and what is to be contained in the bin (histogram value). In particular the aspect of the segmented image correspond to discrete locations of the body part of interest, which are visually captured by pixels of the pixel panel.

In one embodiment, the aspect of the segmented image that is to be the subject of the histogram may include defining the source of the histogram as the approximate boundary of the segmented image. The sampling parameters also define the individual histogram values that are to be derived from the defined aspect of the segmented image. The histogram values may correspond to any characteristic of a pixel representation of the segmented image. For example, the histogram values may be defined, for pixels that are randomly selected using the sampling parameters, as the space between two pixels, the difference in pixel intensity between the two pixels, the respective lengths of orthornormal lines that extend between two or more pairs of selected pixels.

Thus, in step 420, the histogram values are determined for randomly selected pixels based on the sampling parameters. For example, if the sampling parameters define a boundary of the segmented image, then the histogram values that are to be determined may correspond to the distance between two randomly selected points on the boundary of the segmented image.

The histogram values are collected a sufficient number of times so that the collection of histogram values are more invariant to the set of locations from where the information is extracted. The collected information is represented by its histogram. Depending of the source of the information, the histogram representation can be invariant to rotation, translation and scale. Thus, in a given duration, the movement (including rotation and translation) of a body part may be represented by a histogram, and the representation is not compromised or affected by the movement.

The histogram information to be collected may have many forms. One alternative is the use of randomly chosen perpendicular lines as the source for selecting pixels and determining histogram values. The length and/or the angle of each one of the perpendicular lines can be kept as part of the histogram values. The perpendicular lines may extend between pixels randomly selected from, for example, a boundary of the segmented image, although the points forming portions or end-points of the perpendicular lines could be positioned anywhere on the object. In this example, if histogram values are taken for a sufficient number of line pairs, the statistics of the histogram are substantially invariant against the choice of the points.

Regardless of the source of the information, a histogram representation of an image may be meaningful and accurate, and invariant to the random set of points, if the histogram values are collected a sufficient number of times from pixels that are randomly selected. The invariance of the histogram (to rotation, translation or scale) depends on the form of random information used to construct the histogram. For example, if the distance measured between randomly selected pixels of the boundary of the segmented image are used to construct the histogram, then the results provided by the histogram are substantially invariant to rotation and translation but not to the scale of the object. Moreover, any length related random information source results in histograms that are not invariant to scale. If invariance to scale is desired, than the collection of the distance measures should be normalized with respect to the maximum of this collection. As another example, a histogram comprising a collection of angle information for discrete locations of the body part results in invariance to translation and scale, yet not in invariance to rotation.

In addition, due to the nature of the histogram, a small variation on the image results in a small variation in the histogram. This provides a significant advantage for the application of histograms to shape recognition applications, because small variations in the image do not significantly impact the image's representation with the histogram.

In many cases, the source for random information within the histogram comes in forms of vectors, i.e. collection of numbers. For example, if the distance between points and the angle of the line are both kept, than each instance of the random source provides a two-dimensional data. In this case, the histogram of multidimensional data is to be obtained. A method for obtaining multidimensional histograms may be implemented. One such method uses a "k-means algorithm" to cluster the data and to obtain cluster centers. The cluster centers are used as the histogram bin centers. By counting each instance of the random information, i.e. each vector, towards the bins, the multidimensional histogram is obtained.

The resulting histogram, either one dimensional or multidimensional, is a representative (signature) of the underlying image of the hand shape. Step 440 provides that the histogram is stored as the representation for a particular body shape. In this way, the histogram may serve as a signature for the shape of the body part of interest.

FIGS. 5A-5J are a series of snap-shots that illustrate an image of a body part (a hand provided in column 510), the transition of a segmented depth image of the hand (provided in second column 520) over a time period where the hand is gesturing, to an aspect of the image (the boundary) that is designated to provide the statistical information for the histogram (provided in third column 530), to a histogram (fourth column 540). The histogram in the fourth column 540 results in being the signature for a shape of a particular hand shape. In the example provided, random histogram of the distance information provide a representation that is invariant to rotation and translation of the shape. In addition, the distances are normalized with respect to the maximum observed distance. In this way, invariance to scale is achieved, so that hands varying in size have similar histograms for the same gesture. In addition, the histograms are resilient to small variations in the shape. This allows the system to be invariant to small variations in the image when the same posture is intended.

As shown in FIGS. 5A-5I, various hand gestures are each associated with a unique histogram. For example, a raised fist in FIG. 5C has a different histogram than two fingers extended in FIG. 5A. In one embodiment, each static hand gesture captured in column 510 may be classified as an input. In another embodiment, the hand gestures captured in column 510 represent a hand that is moving, and the histogram is of just one instance while the hand is moving. In still another embodiment, all of the hand gestures collectively can be classified as one set of input.

In another embodiment of the system, other methods in the literature could be used for shape representation. Among these methods are moment invariants and descriptors, Fourier descriptors and Elliptic Fourier Descriptors.

Figure 6:
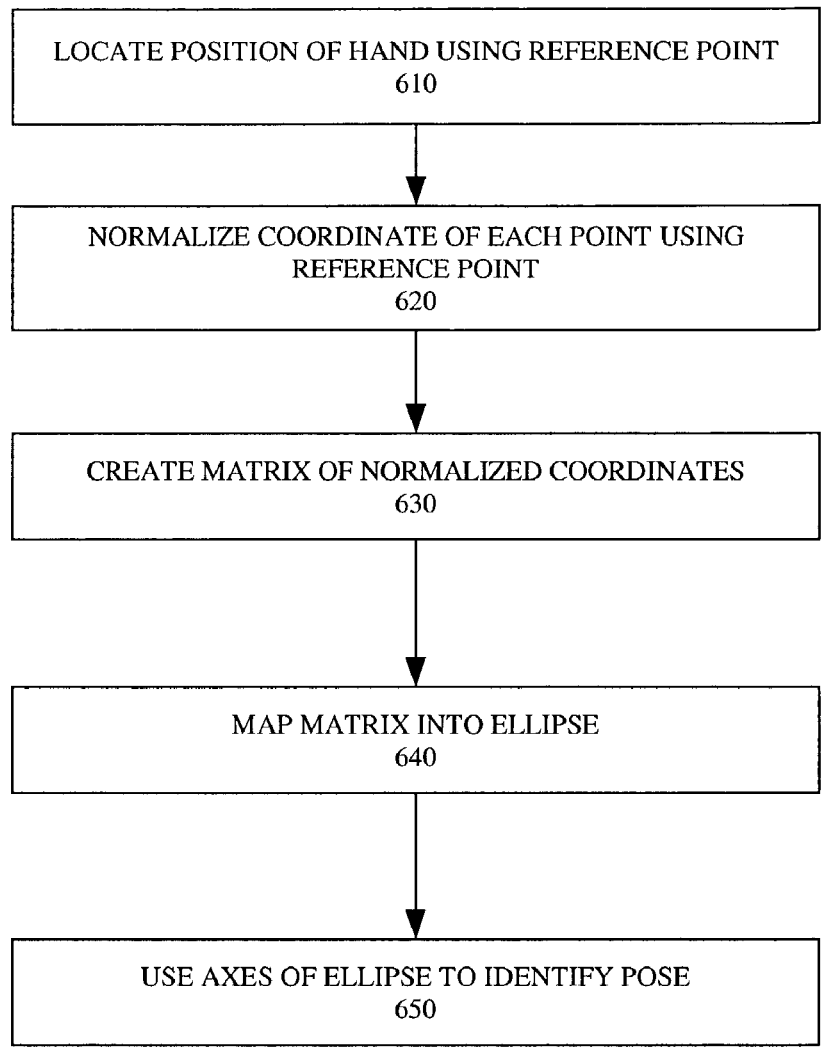
FIG. 6 provides a more detailed description of a method for determining a pose of a body part of interest, where the body part of interest is assumed to be a hand.

The pose of a body part may be represented by the position and orientation of the body part. The position of the body part may be provided by the position of a designated reference position on that body part. FIG. 6 provides a more detailed description of a method for determining a pose of a body part of interest, where the body part of interest is assumed to be a hand.

In step 610, the position of a hand may be given by its center location. The center location may be based on the average of the coordinates of every point in the hand.

Step 620 provides that the normalized coordinate of each point (or a substantial number of points) on the hand is obtained. The normalized coordinates may be obtained by subtracting the center location coordinate from each one of the coordinates.

In step 630, a singular value decomposition algorithm is applied to the normalized coordinate of each point on the hand. This may require first listing the normalized coordinates into one column of a matrix. When the singular decomposition algorithm is applied on the matrix, singular vectors result that define a shape of an ellipse. The resulting singular vectors correspond to the major and minor axis directions of the orientation of the hand. Similarly, the singular values given by the major and minor axes correspond to lengths of the ellipse that best fits the hand. Thus, the pose can be defined by the direction and lengths of the major and minor axes that are identified for the hand.

The combination of the hand shape and pose give the body part posture representation at a particular time. As will be described, additional body part representations may be derived in succeeding intervals in order to determine a dynamic gesture representation.

F. Dynamic Gesture Representation

Embodiments of the invention provide for recognizing dynamic gesture representation of a body part. Dynamic gesture representation may occur when the body part is moved, and the movement is to be recognized as part of the overall gesture. In one embodiment, the dynamic gesture representation corresponds to a series of body posture representations, taken over a duration of time.

For purpose of illustration, the description of the methods and techniques in this section are for hand gestures. For example, a user directing one hand at an electronic device while raising two fingers may be recognized and interpreted as a first command. In the same example, the user may make the same motion, but have his hand postured into a first. This may be recognized as a completely different command. The user may enter one or more commands by taking his hand from a first to two fingers extended outright. Still further, the direction of movement of the hand, with the posture of the fingers or palm (the posture could also be changing) may be recognizable as input. For example, a user pointing at a device while moving his hand towards it may be interpreted different than a user pointing at the device while moving his hand away from the device.

One of the challenges for a hand (or other body part) gesture representation is the determination of the beginning and end of a dynamic or moving hand gesture. Classification based algorithms, such as Hidden Markov Models exist for this task, yet a robust solution would require a well-defined procedure.

Another approach is to use a delimiter functions. For example, one or more of the following delimiter functions may be employed: (a) a specific hand gesture to delimit the beginning and/or end of a hand gesture; (b) a person stopping at the end of a gesture that is to be recognized; (c) a person creating a specific sound to delimit the beginning and/or end of a hand gesture; and (d) for computer applications and the like, the user inputting a specific key to delimit the beginning and/or end of the hand gesture. Between the delimiter functions, the user may perform the dynamic gesture.

Figure 7:
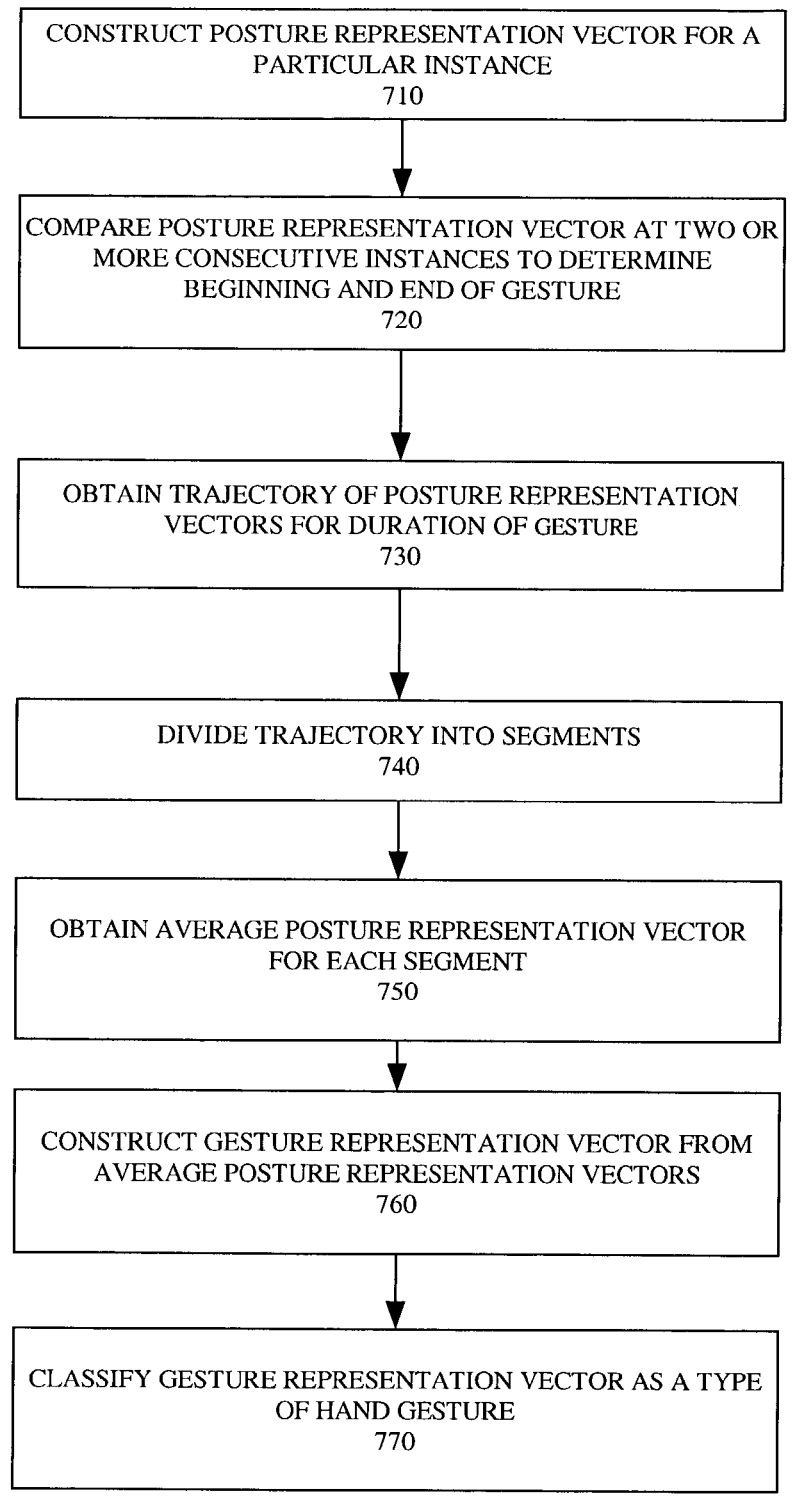
FIG. 7 illustrates another embodiment where the beginning and end of a dynamic gesture are determined through analysis of discrete body gestures recognized at consecutive instances of time.

FIG. 7 illustrates another embodiment where the beginning and end of a dynamic gesture are determined through analysis of discrete body gestures recognized at consecutive instances of time. Thus, the beginning and end of the gesture are not determined independently of the recognition analysis, but rather require the recognition analysis to be performed. FIG. 7 illustrates one embodiment where statistical methods are used to recognize the dynamic gestures.

In step 710, a posture representation vector for a particular instance is constructed. The particular instance may be one of several instances that are determined to be part of the duration when the gesture takes place. The posture representation vector may be constructed as a feature vector from the histograms used in determining the shape of the body part of interest and/or its pose. The feature vector corresponds to a one-dimensional matrix that comprises the bin values of the histogram, listed sequentially in the one dimension of the matrix. In an embodiment, the posture representation vector also includes separate values representing the location and the pose of the body at the given instance. The separate values may form the last few elements of the feature vector.

Step 720 provides that the posture representation vector at two or more consecutive instances are compared to determine the beginning and end of the gesture. The basis of comparison may correspond to some designated criteria, or a user-specified criteria. When two or more consecutive posture representation vectors are compared to be equal or close (based on the designated comparison criteria), the conclusion may be drawn that the gesture was either stopped, or became stopped. Thus, for example, two consecutive posture representation vectors that are determined to be equal, followed by a different posture representation vector at the next instant, may represent the beginning of the gesture. Likely, when two consecutive posture representation vectors suddenly are equal, the indication is that a gesture has been completed.

Step 730 provides that a trajectory of posture representation vectors are obtained. The trajectory tracks the posture representation vectors for a given duration that includes the duration of the gesture.

In step 740, the timeline between the beginning and end of the gesture is divided into intervals of approximately equal amounts of body movement. The amount of the body movement can be modeled by the change in the posture vector between the consecutive frames. As a consequence, the trajectory of the posture vectors between the beginning and end of the gesture is divided into equal-length (or equal time) intervals. Given where d is the total trajectory length, and k intervals are constructed, each interval can be assumed to have a length of approximately d/k.

Once the intervals are determined, a representation of each interval is determined in step 750. The representation of each interval may be represented through several techniques. For example, an average of the posture representation vectors in the interval can be used for the representation of that interval. Such representations may be interval representation vectors.

Step 760 provides that a gesture representation vector is constructed from the representation of the individual interval vectors. For example, the k interval representation vectors may be stacked into a gesture representation vector.

In step 770, a gesture representation vector may be classified as a type of gesture as described in Section 6. The type of gesture may correlate to an input for a related electronic device.

In other embodiments, velocity and acceleration based features may be added into the gesture representation vector. These would involve the average and/or instantaneous velocity/acceleration during the gesture. This is useful information since the velocity of a gesture as a method of modifying the meaning of the gesture, say, emphasizing an action.

G. Classification

The final stage of the system is the classification of the gesture vectors into one of the specified gestures. In one embodiment, statistical classification may be used to perform this task. There are various statistical classification algorithms. Such classification algorithms include support vector machines, neural networks, nearest neighbor classification, or Hidden Markov Models. In general, statistical classification involves two main stages, a training stage (off-line) and a classification stage (on-line).

The training stage occurs off-line before the system is put into action. It involves a classifier-learning algorithm that takes a training set as input and produces a classifier as its output. For embodiments such as described herein, a training set is a collection of gesture vectors for a body part of interest. The collection of body gestures may be manually labeled. A classifier is a function that, for any new candidate gesture, tells what type of gesture it is. In other words, the classifier-learning algorithm partitions the space of gesture vectors such that each partition corresponds to one of the gestures in the training set. The classifier function determines which partition a gesture vector falls in.

The classification stage involves the application of the learnt classifier function on new cases. This stage occurs on-line and determines the decision of the system.

H. Communication Protocol Between User And Recognition System

According to one embodiment, a robust gesture recognition system is provided that utilizes high level reasoning to confirm some or all image-based classification decisions. In one embodiment, this is managed by a communication protocol that is defined between the user and the system. This protocol consists of a serious of confirmations from the user regarding the system's decision. Once the user applies the delimiter function, the system gives the most possible answer to the user. The user accepts or rejects the decision by one of the following: (a) a hand gesture, (b) creating a specific sound, and (c) inputting a text or key to the computer.

If the system's first guess is incorrect, the system reveals the second most possible answer, and asks for the confirmation. This procedure continues for a couple of iteration, or until the system gives the correct decision. If the system cannot correctly guess the gesture in a few trials, it asks the user to redo the gesture.

In this manner, the user confirms the system's decision, and the robust operation is attained. In addition, the user can undo his gesture by simply rejecting the system's decision.

I. Description of System Operation

An example of how a system for implementing methods such as described above is provided in detail. Reference is made to elements of FIG. 1 for purpose of facilitating the description. The sensor module 110 senses the presence of a hand, fingers, toes, or other natural elements within region 155, which corresponds to the sensing. The body posture module 130, in combination with the sensor module 110, locates the position (along three axes X, Y and Z) and orientation (pitch, yaw, roll) of user's natural features (fingers, fingernails, hands, etc.). The system may collect the position and orientation information and describes the objects shown in a digital (electronic) representation such as a data structure, table of information, or series of object descriptors.

If there are multiple gestures (by hands or fingers) in the field of view, the system also collects this information because it is computing the distance to every pixel in the field of view. The distance information for every object in view is simultaneously calculated, in real-time. The body gesture representation 150 also interprets the distance information to translate the natural user movement into a specific gesture or meaning. A communication protocol such as described below between the user and the system might be applied to confirm the system's understanding.

Once that the system has processed the distance data to either recognize a certain action described in the system (e.g. a keypress or "thumbs-up" gesture) or describe the field of view in a general way (e.g. "large painting motion in a nearby area") it then creates an appropriate interface event within the electronic system in a way that the electronic system can understand. For instance, in the case of a virtual keyboard (such as described in U.S. Prov. Patent Application No. 60/163,445, incorporated in its entirety herein for all purposes), the location of a keypress is correlated to the layout of a keyboard to determine which key is pressed. The key-code for that key is then sent to the host system in a way that the host system can understand. For instance, in a personal computer, the "ASCII" value for that particular key may be sent to the keyboard device driver. The system works comparably for three-dimensional objects. For instance, if "thumbs-up" were meant to turn up a gesture-controlled radio than the appropriate "volume up" command would be sent to the electronic system. In the general case, if a "large painting motion in a nearby area" were made, a data structure describing that event would be sent to a paint program that would understand the data structure and cause the appropriate paint stroke to be recorded.

Embodiments of the invention may support the use of multiple actions simultaneously, and supports interface events that are both known in today's systems (e.g. keystroke, mouse movement) and those that are not known by today's systems. For instance, if two fingers touched a surface at the same time, meaning that two keys were pressed at the same time, the system uses the distance information to interpret these events separately and simultaneously so that two or more actions may be recorded at any given time. This is in contrast to existing systems, such as touch screens based on capacitive differences, which only enable the user to complete one action (e.g. one "touch") at any given time. Similarly, the system supports multiple gestures, which may not be known in today's systems, simultaneously.

Once the event is known to the electronic system, (whether it be a specific event like "G key has been pressed" or "Radio volume up" or general "large painting motion in nearby area") the application software running in the electronic system then reacts to the event. In the case of the keyboard, this would effect a keystroke in the system, causing a letter to appear on a screen, for instance. In the case of the gesture-controlled radio, the volume would actually increase. In the general case of the paint program, a painting stroke that approximates the size, intensity, and position of the motion would occur.

J. Application Examples

Various applications exist for a gesture or activity recognition system such as described herein. For example, one application for an embodiment of the invention includes a video game input device that is able to interpret finger, hand, and body motions into actions within the game. For instance, the game player may direct a punch in the air and the game interprets his motions into the game. Similarly, the user can interact with a virtual reality system using his gestures.

Another application is for automobile control device that enables the driver to control, with gestures, the functionality of one or more systems within the car (e.g. thumb up to turn radio up, point down to turn air conditioner down, point at windows and roll the window up or down using a gesture).

Another application is for identifying the locus of where a directional microphone or camera needs to point. For the microphone application, identifying the direction where the sound comes from enables the microphone to only pick up the sound from a narrow angle thus eliminating the background chatter.

Another application includes using a gesture recognition system such as described to implement robotic controls that enable the user to control a "waldo" or electronic arm by replicating the motion of his own limbs. Similarly, the user can communicate by a robot by using his gestures.

Another application for an embodiment of the invention includes a system to interact with models of molecular or other tiny structures by using gestures as if the tiny structures were of a larger physical size.

Still further, an embodiment provides for a computer having a user-interface that does not require any type of form-factor. For instance, the user can put in text input to a computer by using his/her gestures. The user can draw a number or character in the air, which is used as the input to a device.

Another application that can illustrate the diversity of embodiments described herein includes an electronic system for painting. In this case, the user is able to perform the following create a work of art using the natural gestures of his/her own body, without the need for any type of artistic tool. Thus, if an artist wishes to get the effect of "smushing" paint into the painting surface, the artist could, through implementation of an embodiment described herein, use his hand to "smush" in mid-air in order to control and produce the desired effect.

As another example, embodiments such as described enable an artist to employ multiple artistic controls (e.g. two hands) simultaneously to create an improved artistic effect. For instance, with an embodiment such as described, the artist could "paint" a line with one hand and control the change of color with the other so the exact desired color gradation is achieved.

The artist may create the effect of controlling (changing) brush thickness by changing the profile of the contact point. For instance, the artist would use a fingernail for drawing a thin line by moving the finger in the air or a thick line by moving the whole hand down. The artist may create or edit a sophisticated work of art if the artist's limbs or motor skills are impaired making it impossible to handle an artistic implement of any kind. In addition, photographs or realistic images may be edited using finger, hand, or body controls in order to achieve a greater sense of control or artistic expression Still further, a work of art may be edit with a level of control that does not exist in the world today. For example, consider its use in a system that edits photographs. If the photo editor is looking at a woman in a photo and wanted to rustle her hair so that it appeared more messy, then the editor could just take his hand and move it in mid-air as if to rustle someone's hair with the exact intensity and orientation he desired. Then, the electronic photo system outfitted with this invention would interpret that motion and rustle the woman's hair appropriately according to the photo-editor's action. This provides great benefit over known systems for editing photographs (e.g. pens, mouse, electronic paintbrushes). In addition, the intensity of an artistic stroke may be measured to a greater degree and reflect the intensity in the work of art. For instance, if the artist wants to archive a very bold stroke, the artist may, with embodiments such as described herein, strike his hand hard and quickly against the "virtual" painting area.

Further artistic applications include finger painting may be simulated without any mess, and assisting handicapped artists that cannot hold or use traditional artistic implements.

The application examples pertaining to art illustrate the diverse range of functionality and benefits that can be attained with embodiments such as described by this application. Thus, while examples are given for the case of an electronic system which allows for painting and art, numerous other functions and uses may be provided for by other embodiments of the invention.

Embodiments of the invention may also detect and interpret gestures for purpose of changing a parameter of a companion electronic device. For example, embodiments of the invention could be used as a remote control for a television, or as a wireless input mechanism for small devices such as cell phones and personal digital assistants.

For applications such as described, it might be desirable that two-handed gestures are used as input. In these cases, two different paths could be pursued. The first path involves the recognition of two hand gestures that work independently (turning two independent knobs). This would involve the application of the same recognition system on each hand. As an alternative, the meaning of one hand may influence the meaning of the other.

K. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method to enable a person to interact with an electronic device by way of a gesture by a body part of said person, the method including the following steps:
    (a) obtaining position information for a plurality of discrete regions on said body part, said position information indicating a depth of each discrete region on said body part relative to a reference, said position information obtained at a plurality of instances during a given time duration interval;
    (b) detecting from position information obtained at step (a) start time and end time of a dynamic gesture by said body part, wherein said given time duration interval is defined between said start time and said end time; and
    (c) classifying said dynamic gesture formed by said body part as an input for interacting with said electronic device using position information obtained during said given time duration interval at each instance in said plurality of instances.

2. The method of claim 1, wherein step (a) includes providing a pixel array to capture an image of a scene including said body part, wherein each pixel in said array corresponds to a discrete region of said scene.

3. The method of claim 2, further including segmenting said body part from a remainder of said scene, wherein segmenting is carried out in a manner selected from a group consisting of (i) using position information to cluster together pixels representing portions of said body part, (ii) using position information to cluster together pixels representing portions of said body part based on similar depth information, and (iii) clustering together pixels representing portions of said body part based at least partially on a depth of a discrete region from said reference.

4. The method of claim 2, further including performing a statistical analysis on said image in a manner selected from a group consisting of (I) identifying a shape of said body part, and (II) performing a statistical analysis on an image portion including said body part segmented from said scene; wherein performing a statistical analysis includes at least one of (i) creating a histogram using coordinates that identify pixels in said pixel array, and (ii) creating a histogram using coordinates that identity pixels in said pixel array on a boundary of said image.

5. The method of claim 1, further including segmenting said body part from a remainder of a scene including said body part.

6. The method of claim 1, further comprising identifying at least one of (i) a shape of said body part, (ii) a shape of said body part identified by performing statistical analysis on said image, (iii) a pose of said body part, and (iv) a pose and orientation of said body part.

7. The method of claim 1, wherein step (c) includes classifying said gesture based on at least one of (i) shape of said body part, (ii) pose of said body part, and (iii) classifying a series of body postures occurring at multiple instances of said time duration interval wherein a combination of said body postures forms said gesture.

8. The method of claim 1, wherein said body part includes at least one of said person's hands, and step (c) includes using said position information to classify a gesture created by at least one of said person's hands.

9. The method of claim 1, wherein step (c) includes using position information to classify a gesture formed by at least one of a finger, a hand, an arm, a shoulder, an eye ball, an eye lid, a head, a foot, and a leg of said person.

10. The method of claim 1, wherein step (c) classifies said gesture as input for an electronic device selected from a group consisting of a portable computer, a television system, an audio system, a game console, a mobile phone, a robot, and an appliance.

11. The method of claim 1, wherein step (a) includes obtaining position information at a plurality of instances during a given said time duration interval.

12. The method of claim 11, wherein step (c) includes using position information obtained at each instance to classify a gesture formed by movement of said body part during said time duration.

13. The method of claim 1, wherein at step (b), detecting start of a gesture includes detecting an occurrence of a first delimiter action signifying when a gesture starts.

14. The method of claim 1, wherein at step (b), detecting when a gesture ends includes detecting an occurrence of a second delimiter action signifying when a gesture ends.

15. The method of claim 1, wherein at step (b), detecting at least one of start and end of a gesture includes detecting an occurrence of a delimiter action that creates a designated audible sound.

16. The method of claim 15, wherein at least one of said first delimiter action and said second delimiter action corresponds to formation of a specific posture of one of the said body part of said person and another body part of said person.

17. The method of claim 1, further including indicating gesture classification to said person before classifying said gesture as said input.

18. The method of claim 17, further including receiving confirmation from said person that said input is what said person intended to enter.

19. The method of claim 18, further including detecting said confirmation.

20. The method of claim 19, wherein detecting said confirmation includes detecting at least one of another gesture by said person, an audible signal created by said person, and a manual entry by said person into said device.

21. The method of claim 1, wherein at least one of step (a) and step (c) is provided as instructions on a computer-readable medium, said instructions being executable by at least one processor to perform such step.

* * * * *